United States Patent [19]

Egraz et al.

[11] Patent Number: 6,063,884

[45] Date of Patent: May 16, 2000

[54] METHOD OF MANUFACTURING WATER-SOLUBLE POLYMERS, POLYMERS MANUFACTURED THEREBY, AND USES OF SAID POLYMERS

[75] Inventors: Jean-Bernard Egraz, Ecully; Jean-Marc Suau, Lucenay; Yves Kensicher, Lozanne, all of France

[73] Assignee: Coatex S.A., Genay, France

[21] Appl. No.: 09/219,887

[22] Filed: Dec. 24, 1998

Related U.S. Application Data

[62] Division of application No. 08/897,572, Jul. 21, 1997, Pat. No. 5,891,972.

[30] Foreign Application Priority Data

Jul. 19, 1996 [FR] France .................................. 96 09345

[51] Int. Cl.[7] ............................................... C08F 2/00
[52] U.S. Cl. ............................................................. 526/233
[58] Field of Search ............................................. 526/233

[56] References Cited

U.S. PATENT DOCUMENTS

| 2,789,099 | 4/1957 | Rife et al. . | |
|---|---|---|---|
| 2,957,931 | 10/1960 | Hamilton et al. . | |
| 4,621,127 | 11/1986 | Danzinger et al. | 526/233 |
| 5,077,361 | 12/1991 | Hughes et al. . | |
| 5,185,413 | 2/1993 | Yoshinaga et al. | 526/233 |
| 5,216,099 | 6/1993 | Hughes et al. . | |
| 5,294,686 | 3/1994 | Fiarman et al. | 526/233 |

FOREIGN PATENT DOCUMENTS

| 0 398 653 | 11/1990 | European Pat. Off. . | |
|---|---|---|---|
| 05 10831 | 10/1992 | European Pat. Off. . | |
| 0510831 | 10/1992 | European Pat. Off. | 526/233 |
| 36 03 392 | 8/1987 | Germany . | |
| 49-08672 | 7/1974 | Japan | 526/233 |
| 53-127 586 | 11/1978 | Japan . | |
| 53-127586 | 11/1978 | Japan | 526/233 |
| 2-34694 | 2/1990 | Japan | 526/233 |
| 05 78849 | 7/1946 | United Kingdom . | |
| 0578849 | 7/1946 | United Kingdom | 526/233 |

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

Homopolymers and/or copolymers are manufactured by polymerizing ethylenically monounsaturated monomer(s) in an aqueous solution in a reaction vessel containing compounds which contain a phosphorus atom of degree of oxidation less than 5, phosphorous compounds being introduced in amounts of 0.005–0.49 gram-atom phosphorus per mol of unsaturation in said ethylenically unsaturated monomer(s) in the presence of hydrogen peroxide and in the absence of any agent(s) which decomposes hydrogen peroxide thereby forming free radicals, in the absence of any other generator of free radicals, and in the absence of any per salt and/or any other transfer agent.

8 Claims, No Drawings

METHOD OF MANUFACTURING WATER-SOLUBLE POLYMERS, POLYMERS MANUFACTURED THEREBY, AND USES OF SAID POLYMERS

This is a division of application Ser. No. 08/897,572 filed Jul. 21, 1997, now U.S. Pat. No. 5,891,972.

BACKGROUND OF THE INVENTION

1. Field of the Invention

The present invention relates to a method of manufacturing homopolymers and/or copolymers, in an aqueous solution of ethylenically monounsaturated monomers, e.g. acrylic and/or vinylic monomers, such that, for each monomer, one can achieve a residual monomer concentration less than or equal to 300 ppm (based on the weight of the raw product), wherewith the concentration of the products is at least 38%; and wherewith these results can be achieved regardless of the monomer(s) used, and at the end of the polymerization, without the need for any intervening treatment.

The invention also relates to the homopolymers and/or copolymers manufactured by the described method; and the use of said homopolymers and/or copolymers, as:

milling agents and/or dispersants in aqueous suspensions of mineral materials; or sequestering agents and/or precipitation inhibitors and/or inhibitors of mineral incrustation (particularly with respect to heat transfer surfaces in industrial or household systems); or fluidifying agents for aqueous suspensions based on non-saline or saline water, which suspensions are used as drilling fluids (muds) and the like in the areas of civil engineering, construction, public works, minerals prospecting, and petroleum production; or stabilizers for suspensions of zeolites; or anti-scaling agents and dispersant agents, in detergent formulations containing hypochlorite compounds, wherewith the subject polymers do not destabilize the "chlorometric index" of said hypochlorite compounds; or "builders" in detergent compositions; or water retention agents in the paper industry.

The invention further relates to the abovementioned aqueous suspensions of mineral materials, having characteristics of long term stability and high concentrations of the mineral materials; and the use of the suspensions in areas such as paper, paints and other coatings, detergents and other cleaning agents, ceramics, mineral drilling and production (e.g. drilling-mud compositions), and other sectors which employ such suspensions.

2. Description of the Background

Various methods have long been known for homopolymerization, in solution, of acrylic and/or vinylic monomers, e.g. (meth)acrylic acid, maleic anhydride, and acrylamide; and for copolymerization, in aqueous solution, of acrylic acid with monoethylenically unsaturated comonomers such as, e.g., maleic anhydride, itaconic acid, acrylamide, (acrylamidomethyl)propanesulfonic acid, and acrylate esters. However, none of these methods is entirely satisfactory in the light of current and/or expected environmental regulations, particularly regulations governing the residual monomer content in the polymer in a given application, or requirements as to the color and/or odor of the product.

Eur. Pats. 0,668,298 and 0,608,845 describe methods of copolymerization which, unless subsequent treatments are employed, result in residual monomer contents which exceed 1000 ppm. These methods would not meet the standards demanded in the current market.

Eur. Pat. 0,618,240 discloses a method enabling production of polymers with lower residual monomer content, as do Eur. Pats. 0,398,724, 0,510,831, and 0,663,408; however, all have fundamental practical disadvantages connected with the method, or disadvantages such as:

the use of metallic salts which promote decomposition reactions of hydrogen peroxide, e.g. the Fenton reaction, which often result(s) in ultimate products which are undesirably colored and which contain metal salts which are environmental pollutants;

the use of persulfates which undergo decomposition because of the application of heat or because of redox reactions, resulting in ultimate products which undesirably contain sulfur; and the use of organic initiators, e.g. organic peroxides, particularly benzoyl peroxide, which result in the production of undesirable by-products such as certain nitrogen compounds.

U.S. Pat. No. 4,301,266 discloses a method of manufacturing acrylic acid polymers, with the disadvantage that one must use a solvent of the isopropanol type and must operate at elevated pressure.

Also known to those skilled in the art is U.S. Pat. No. 4,621,127, which discloses a method of copolymerization. The method is costly and lengthy, and requires the use of chain regulators to prepare low molecular weight polymers.

SUMMARY OF THE INVENTION

Accordingly, one object of the invention is to provide a method which enables the production of dissolved polymers which are colorless, odorless, and which are accompanied by very low (minimum) amounts of residual monomers and undesirable organic by-products.

Another object of the invention is to provide a milling agent and/or dispersant for aqueous suspensions of mineral materials, which enables production of concentrated aqueous dispersions of mineral particles, which dispersions have relatively low viscosity and are durably stable even without agitation.

Still another object of the invention is to provide a sequestering agent and/or precipitation inhibitor and/or inhibitor of mineral incrustation, using a copolymer of the described type having a molecular weight low enough to be adapted to such applications.

Yet another object of the invention is to provide a fluidifying agent for aqueous suspensions which are used as drilling fluids (muds) and the like; or a stabilizer for suspensions of zeolites; or an anti-scaling agent and dispersant agent, for use in detergent formulations containing hypochlorite compounds, wherewith said agent does not destabilize the "chlorometric index" of said hypochlorite compounds; or a "builder" for detergent compositions and the like.

Still another object of the invention is to provide aqueous suspensions in paper pulp processing, processing of pastes and slurries in sugar manufacture, paper coating, ceramics manufacture, detergent formulation, and formulation of drilling muds and the like.

Briefly, these objects and other objects of the present invention as hereinafter will become more readily apparent can be attained in a method of polymerization in which compounds containing a phosphorus atom, having a degree of oxidation less than 5, are introduced in amounts corresponding to 0.005–0.49 gram-atom phosphorus per mol of unsaturation in the monomer(s) to be polymerized, into the reaction vessel or into the starting monomer mixture in the reaction vessel as into the reaction vessel, prior to the start of the polymerization, said introduction occurring:

in the presence of hydrogen peroxide and in the absence of any agents, which decompose hydrogen peroxide to form free radicals, such as metals or metal salts, which agents are deemed necessary by the art to satisfactorily achieve such decomposition, further, in the absence of any other generator of free radicals, and in the absence of any per salt and/or any other transfer agent.

DETAILED DESCRIPTION OF THE PREFERRED EMBODIMENTS

Whereas the prior art to which the present invention relates describes methods of polymerization which make use of decomposition reactions of hydrogen peroxide of the type of the Fenton reaction, or employs reactions of thermal or redox decomposition of initiators currently in use, it has now been found, and quite surprisingly, that the use of a compound containing a phosphorus atom of degree of oxidation less than 5, when introduced in amounts corresponding to 0.005–0.49 g-atom phosphorus per mol of unsaturation in monomers in an aqueous reaction medium enables:

homopolymerization of a monomer such as (meth)acrylic acid or maleic acid, or copolymerization of maleic acid or a copolymerizable monomer, with acrylic acid or a copolymerizable monomer, with the addition solely of hydrogen peroxide, without the presence of agents which promote decomposition of hydrogen peroxide to form free radicals, e.g. metals or metal salts, such as salts of Cu, Fe, Co, Ni, Zn, W, Ce, Mo, Zr, or mixtures of these, which agents are deemed necessary in the art in order to satisfactorily achieve such decomposition, e.g. in the familiar Fenton reaction, and further without the presence of organic initiators, e.g. benzoyl peroxide, and further without the presence of per salts, e.g. persulfates, and further without the presence of other transfer agents e.g., thio compounds, alcohols, halides, amines, and the like.

The copolymerizable monomers are selected from the group consisting of (meth)acrylic acid, itaconic acid, crotonic acid, fumaric acid, maleic acid anhydride, isocrotonic acid, acronitic acid, mesaconic acid, sinapic acid, undecylenic acid, angelic acid; esters of the aforesaid acids; (acrylamidomethyl)propanesulfonic acid, acrolein, (meth)acrylamide; (meth)acrylamidopropyl trimethylammonium chloride, (meth)acrylamidopropyl trimethylammonium sulfate, ethyl trimethylammonium chloride (meth)acrylate, ethyl trimethylammonium sulfate (meth)acrylate, acryloyl (trimethylammonium chloride), acryloyl (trimethylammonium sulfate), or the non-quaternized homologs of any of these; dimethyldiallyl chloride, sodium methallyl sulfonate, ethylene glycol (meth)acrylate phosphate, propylene glycol (meth)acrylate phosphate, and vinylpyrrolidone.

The present method enables (co)polymerization in an aqueous phase in a continuous or semicontinuous or batch process, yielding a copolymer having a residual monomer content of less than or equal to 300 ppm on the basis of the raw product for each monomer. The concentration of the product copolymers is at least 38% regardless of the amounts of the monomers by weight, and after the termination of the polymerization, it is not necessary to resort to any of the customary treatments well-known to persons skilled in the art such as distillation or adding excess oxidizing or reducing agent following the polymerization.

The present method of manufacturing homopolymers and/or copolymers, in an aqueous solution, from ethylenically monounsaturated monomers, such as acrylic and/or vinylic monomers, occurs with compounds which contain a phosphorus atom of a degree of oxidation less than 5, which are introduced into the reaction medium in amounts corresponding to 0.005–0.49 g-atom phosphorus per mol of unsaturation in the monomers polymerized, in the presence of hydrogen peroxide and in the absence of any agents which promote decomposition of hydrogen peroxide to form free radicals, and further, in the absence of any other generator of free radicals, and in the absence of any per salt and/or any other transfer agent. More particularly, in the method, all or part of the necessary quantity of the compound containing a phosphorus atom of degree of oxidation less than 5 is introduced into the reaction vessel or into the starting mixture in the reaction vessel, prior to the start of the polymerization, which introduction may occur in the presence of all or part of the monomer(s) which are to undergo polymerization, which monomer(s) if then present may be present as acids or in a partially or completely neutralized state by neutralization with a basic solution. Further the method results in the production of homopolymer(s) and/or copolymers without addition of metals or metallic salts, which metals or metallic salts initiate the decomposition of hydrogen peroxide.

In the present method of copolymerization, copolymerization is conducted, regardless of the proportions by weight of the monomers, by introducing into the reaction vessel or into the starting mixture in the reaction vessel, all or part of the quantity of the compound containing a phosphorus atom of degree of oxidation less than 5, which compound is selected from the group consisting of sodium hypophosphite and hypophosphorous acid, the quantity being determined depending on the desired molecular weight of the polymer, and the introduction may be:

in the presence all or part of the monomer(s) to be polymerized, which monomer(s) if then present may be present as the acids or in a partially or completely neutralized state provided by neutralization with a basic solution, and generally in the presence of sufficient added water to obtain a homogeneous solution.

The base used may be sodium hydroxide, potassium hydroxide, or lithium hydroxide, which may be added in the form of a solution or as pellets.

It should be noted that in the present method the expected molecular weight of the copolymer (in the case of manufacture of a copolymer) is not directly a function of the amount of hydrogen peroxide employed, but rather is governed by the relative amount of phosphorus employed and the concentration of the medium.

In the present method when homopolymerizing acrylic acid, methacrylic acid, or maleic acid, homopolymerization is conducted by combining the monomer, the hydrogen peroxide, the compound containing a phosphorus atom of degree of oxidation less than 5, the additional water, and possibly one or more of the abovementioned bases. In particular, the following procedure may be used in which the reactor is preheated and is charged with:

- all or part of the total amount of the monomer to be polymerized,
- all or part of the total amount of the compound containing a phosphorus atom which is sodium hypophosphite as hypophosphorous acid, in an amount determined by the desired molecular weight, and
- a quantity of water as needed to prepare a homogeneous solution.

Following this the hydrogen peroxide is injected into the reactor. A base comprising one or more of the abovementioned bases is added in a manner and at a time or times such that the injection of the hydrogen peroxide will be in the presence of said base.

Then at the end of the homopolymerization or copolymerization of a reaction duration of preferably 2 hr or less, the copolymer obtained is cooled and then is recovered without further treatment, to be used directly in the form recovered.

The copolymer may also be partially or completely neutralized by one or more neutralizing agents having a monovalent or polyvalent function, e.g. agents selected from the groups consisting of:

- alkali cations, particularly those of sodium and potassium, and also ammonium ion;
- the primary, secondary, or tertiary amines, aliphatic and/or cyclic, e.g. mono-, di-, and triethanolamine, mono- and diethylamine, cyclohexylamine, and methylcyclohexylamine;
- the divalent alkaline earth cations, particularly those of magnesium and calcium, and the divalent zinc cation;
- the trivalent cations, particularly aluminum; certain cations of higher valence; and
- cations of primary and secondary amines, aliphatic and/or cyclical, e.g. cations of monoethylamine, diethylamine, cyclohexylamine, methylcyclohexylamine(s); and combinations thereof.

The polymer may also be treated by any known means to eliminate the water, particularly whereby the polymer is isolated in the form of a fine powder and made use of as said powder.

The polymers obtained from the present method have a residual monomer content by 300 ppm on the basis of the raw product for each monomer, and the dry matter content is at least 38% regardless of the monomer proportions employed.

The residual monomer content is determined by an HPLC method with internal standardization, using an HPLC apparatus having a UV and visible light detector enabling operation in the range 180–220 nm, and employing a "Microbondapak" chromatographic column.

The copolymers intended to be used as milling agents, dispersants, fluidifying agents for drilling fluids, and/or rheological modifiers in detergent formulations of the invention have specific viscosity, defined infra as less than or equal to 10, and preferably less than or equal to 3.

In the case the present copolymers are intended to be used for treatment of industrial and/or household waters, e.g. to confer anti-scaling and anti-corrosion characteristics, or are intended to be used in the areas of reverse osmosis and ultrafiltration for completing of cations present, the specific viscosities of the copolymers are in the range 0.10 to 10.

The "specific viscosity" referred to is symbolized by the letter p, and is determined in the following manner:

A solution of the polymer is prepared comprising 2.5 g dry polymer and 50 mL of doubly deionized water. Then a capillary viscometer having a Baumé constant of 0.000105, operating in a 25° C. temperature bath, is used to measure:

- the efflux time of a given volume of said solution containing the copolymer and
- the efflux time of the same volume of doubly de-ionized water, not containing the copolymer.

The specific viscosity $\mu$ is then defined by the following relation:

$$\mu=[(\text{efflux time of the polymer solution})-(\text{efflux time of the doubly de-ionized water})]\div(\text{efflux time of the doubly de-ionized water}).$$

For homopolymers of acrylic acid, the measurement of the specific viscosity is determined by comparison of

- the efflux time of a given volume of a solution of 2.5 g of the corresponding sodium polyacrylate (dry) in 50 mL of a 60 g/L aqueous solution of sodium chloride to
- the efflux time of an equal volume of aqueous sodium chloride solution without the polyacrylate.

The specific viscosity is then given by:

$$\mu=[(\text{efflux time of the polymer solution})-(\text{efflux time of the NaCl solution})\div(\text{efflux time of the NaCl solution}).$$

In both cases the capillary tube is generally chosen such that the efflux time of the doubly deionized water or the NaCl solution without the polymer and/or copolymer is c. 90–100 sec.

The resulting specific viscosity measurements are very precise.

In practice, a dispersion is prepared from the mineral substance to be dispersed, by introducing said substance into an aqueous solution of the present dispersant which solution has been prepared with agitation. The mineral substance may be any of a wide range of materials, e.g.: natural or synthetic calcium carbonate, dolomite, calcium sulfate, titanium dioxide, lamellar pigments such as mica, and/or kaolin, and/or other materials having the characteristic that they must be prepared in suspension and dispersed in order to be utilized in a given application. Some of the very diverse areas of application which might be mentioned are: paper coating; pigmentation of paints; ceramics manufacturing; preparation of drilling muds; and preparation and use of detergents.

The mineral substance may be finely comminuted using comminuting bodies, in an aqueous medium containing the milling agent. For the fine comminution, an aqueous suspension of the mineral substance is formed wherewith the mineral substance has initial particle size not greater than 50 micron and is present in an amount such that the dry matter content of said suspension is at least 70 wt. %.

The comminuting bodies, advantageously having particle size(s) in the range 0.20 to 4 mm, are added to the suspension of the mineral substance to be comminuted. The comminuting bodies are generally in the form of particles of widely diverse materials, e.g. (inter alia):

silicon oxide, aluminum oxide, zirconium oxide, or mixtures thereof;

hard synthetic resins; and steels.

An example of the composition of such comminuting bodies is given in Fr. Pat. 2,303,681, which describes comminuting bodies comprised of zirconium oxide in the amount of 30–70 wt. %, aluminum oxide 0.1–5 wt. %, and silicon oxide 5–20 wt. %. The comminuting bodies are added to the suspension in an amount such that, preferably, the ratio between the weight of the comminuting material and the weight of the mineral substance undergoing comminution is at least 2:1, particularly preferably in the range 3:1 to 5:1.

The mixture of the suspension and the comminuting bodies is then subjected to mechanical agitation, of the sort provided in a classical comminuting mill with microelements.

The present polymeric milling agent and/or dispersant is also introduced into a mixture comprised of the aqueous suspension of the mineral substances to which the comminuting bodies have been added. The amount of the polymer employed is 0.2 to 2 wt. %, based on the dry weight of said polymer and the dry weight of the mineral substance undergoing comminution. The time needed to finely comminute the mineral substances varies according to the nature and amount of said mineral substances, the mode of agitation employed, and the temperature of the medium during the comminution.

Having generally described this invention, a further understanding can be obtained by reference to certain specific examples which are provided herein for purposes of illustration only and are not intended to be limiting unless otherwise specified.

EXAMPLE 1

The objective here is to illustrate an embodiment of the invention in which homopolymers of acrylic acid are prepared in the absence of any metal or metal salt, in which hydrogen peroxide and acrylic acid are added simultaneously and in parallel to a preheated polymerization reactor which has been charged with:

(i) water;

(ii) (possibly) part or all of the hypophosphite or hypophosphorous acid needed; and (iii) (possibly) part of the acrylic acid, which acrylic acid may be partially pre-neutralized by, e.g., sodium hydroxide.

Experiment No. 1

A starting mixture comprised of 132 g of 100% acrylic acid, 132 g of 50% sodium hydroxide, 77 g of sodium hypophosphite, and 200 g of water was charged, at ambient temperature, to a glass 2 L reactor having a stirrer, a thermometer, and cooling means.

As the temperature in the starting mixture increased, the two charges to be introduced in parallel over a period of 2 hr are prepared.

The first such charge comprises 1024 g of 100% acrylic acid, in one beaker, and the second charge comprises 40 g of hydrogen peroxide, which corresponds to 130 volumes free oxygen, plus 120 g water, said second charge being prepared in a second beaker.

These charges are added gradually to the reactor over 2 hr at 95° C., following which is obtained a polymer in a solution which is clear and colorless. The polymer is then neutralized by adding sodium hydroxide of concentration 50%, to a pH of 8.6. The polyacrylate thus obtained corresponds to a homopolymer of the invention having a specific viscosity of 0.64 and a dry matter content of 50.6%. The residual content of acrylic acid is 260 ppm determined with respect to the raw product, according to the above-described HPLC method.

Experiment No. 2

This experiment is carried out with the same apparatus, the same mode of operation, and the same quantities of reactants as described in Experiment No. 1, with the exception that the amount of 130 volumes of hydrogen peroxide, which is employed, is changed from 3.46 wt. % of the amount of acrylic acid to 6.9 wt. % of the amount of acrylic acid.

The colorless polyacrylate obtained has a specific viscosity of 0.70, a dry matter content of 45.4% after neutralization to pH 8.6, and a residual acrylic acid content of 10 ppm determined on the raw product by the analytical method used in Experiment No. 1.

Experiment No. 3

This experiment is carried out with the same apparatus and mode of operation as Experiment No. 1, but the amount of hypophosphite employed corresponds to 0.068 gram-atom phosphorus per mol of monomer to be polymerized, and the amount of the hydrogen peroxide employed is 1.73 wt. % of the total amount of acrylic acid.

The colorless polyacrylate obtained has a specific viscosity of 0.41, a dry matter content of 45.2% after neutralization to pH 8.6, and a residual acrylic acid content of 24 ppm determined on the raw product by the analytical method used in Experiment No. 1.

Experiment No. 4

This experiment is carried out with the same apparatus and mode of operation as Experiment No. 1, but the concentration of acrylic acid in the starting mixture and the amount of water are varied. The content of the monomer in the starting mixture is 26.5 wt. %, and the content of sodium hypophosphite in the starting mixture is also 26.5 wt. %. he amount of the hydrogen peroxide added is 1.73 wt. % of the total amount of acrylic acid.

The colorless solution obtained is a polyacrylate having specific viscosity of 0.57, a dry matter content of 43.5% after neutralization to pH 8.6 with sodium hydroxide of concentration 50%, and a residual acrylic acid content less than 10 ppm as determined by the analytical method used in Experiment No. 1.

Experiment No. 5

This experiment is carried out with the same apparatus, the same mode of operation, and the same quantities of reactants as in the preceding Experiment, with the exception that the amount of the hydrogen peroxide employed is changed to 3.46 wt. % of the total amount of acrylic acid.

The polymer obtained is a colorless polyacrylate having a specific viscosity of 0.53, a dry matter content of 43.6% after neutralization to pH 8.6 with sodium hydroxide of concentration 50%, and a residual acrylic acid content of 70 ppm determined with respect to the raw product according to the abovementioned HPLC method.

Experiment No. 6

This experiment is carried out with the same apparatus, the same mode of operation, and the same quantities of reactants as in the preceding Experiment, with the exception that the amount of the hydrogen peroxide employed is changed to 6.9 wt. % of the total amount of acrylic acid.

The colorless solution obtained is a polyacrylate having a specific viscosity 0.66, a dry matter content of 41.6% after neutralization to pH 8.6 with sodium hydroxide of concentration 50%, and a residual acrylic acid content of 120 ppm determined on the raw product by the analytical method used in the preceding Experiments.

Experiment No. 7

This experiment is carried out with the same apparatus and mode of operation as in the preceding Experiment, but the "starting mixture" is comprised of only water, and the amount of the hydrogen peroxide employed was 3.46 wt. % of the amount of acrylic acid, which acrylic acid was added in parallel with said hydrogen peroxide.

The polymer produced is a colorless solution of polyacrylic acid having a specific viscosity of 0.82, a dry matter content of 44.6% after neutralization to pH 8.6 with sodium hydroxide of concentration 50%, and a residual acrylic acid content of 120 ppm determined on the raw product, according to the analytical method used in the preceding Experiments.

Experiment No. 8

This experiment is carried out with the same apparatus as described in Experiment No. 7.

A starting mixture comprising 35 g sodium hypophosphite and 500 g water is prepared at ambient temperature in a reactor.

Two charges to be introduced in parallel to the reactor with heating to reflux are also prepared which are a first beaker of 462 g 100% acrylic acid and a second beaker of 37 g of hydrogen peroxide. The contents of the beakers are charged, along with 63 g water, into the reactor.

The charges are added over a period of 2 hr, following which is obtained, a clear, colorless polyacrylic acid having a specific viscosity of 0.55.

After neutralization to pH 8.6 by adding sodium hydroxide of concentration 50%, the polyacrylate obtained has a dry matter content 38.4% and a residual acrylic acid content of 190 ppm, on the raw product, according to the analytical method used in the preceding Experiments.

Experiment No. 9

This experiment is identical to the preceding Experiment, except that only one fourth of the amount of sodium hypophosphite is charged to the reactor in the starting mixture. The polyacrylic acid obtained is clear and colorless, having a specific viscosity of 0.53.

After neutralization to pH 8.6 by adding sodium hydroxide of concentration 50%, the polyacrylate obtained has a dry matter content of 38.4% and a residual acrylic acid content less than 10 ppm determined on the raw product, according to the analytical method used in the preceding Experiments.

Experiment No. 10

This experiment was carried out with the same apparatus and the same general method as used in the preceding Experiments. In the method, the following components are combined:

a starting mixture in the reactor, comprising 130 g water, 30 g of 100% acrylic acid, 30 g of 50% sodium hydroxide, and a total amount of sodium hypophosphite, corresponding to 0.024 g-atom phosphorus per mol acrylic acid; and two charges introduced in parallel, the first comprising 467 g of 100% acrylic acid and the second comprising 10 g of hydrogen peroxide, plus 190 g water.

The polyacrylate obtained is a clear, colorless polyacrylate having a specific viscosity of 1.52.

After neutralization to pH 8.6 by adding sodium hydroxide at a concentration of 50%, the polyacrylate obtained has a dry matter content of 50.7% and a residual acrylic acid content less than 20 ppm determined on the raw product, according to the analytical method used in the preceding Experiments.

Experiment No. 11

This experiment is carried out with the same apparatus and same general method as used in the preceding Experiments. In the method, the following components are combined:

a starting mixture in the reactor, comprising:
340 g water; and
one fourth of the total amount of sodium hypophosphite, the total corresponding to 0.012 g-atom phosphorus per mol acrylic acid; and two charges introduced in parallel:
a first charge comprising 400 g 100% acrylic acid, 200 g water, and the remainder of the total amount of sodium hypophosphite, said total corresponding to 0.012 g-atom phosphorus per mol acrylic acid, and
a second charge comprising 3.3 g of hydrogen peroxide, plus 250 g water.

The polyacrylate obtained is a clear, colorless polyacrylate having a specific viscosity of 2.4.

After neutralization to pH 8.6 by adding sodium hydroxide at a concentration of 50%, the polyacrylate obtained has a dry matter content of 38% and a residual acrylic acid content of 200 ppm determined on the raw product, according to the analytical method used in the preceding Experiments.

Experiment No. 12

This experiment is carried out with the same apparatus and mode of operation as in the preceding Experiment, except that:

the total amount of sodium hypophosphite employed is 80% of that employed in the preceding Experiment; and the amount of the hydrogen peroxide employed is twice the amount employed in the preceding Experiment.

The polyacrylic acid obtained is a clear, colorless polyacrylic acid having a specific viscosity of 3.0.

After neutralization to pH 8.6 by adding sodium hydroxide at a concentration of 50%, the polyacrylate obtained according to the invention has a dry matter content of 38% and a residual acrylic acid content of 300 ppm determined on the raw product, according to the analytical method used in the preceding Experiments.

Experiment No. 13

This experiment is carried out with the same apparatus and mode of operation as in the preceding Experiment, except that:

the total amount of sodium hypophosphite employed is 0.0077 g-atom phosphorus per mol acrylic acid polymerized; and the amount of the hydrogen peroxide employed is 78% of the amount employed in Experiment 11.

The polyacrylic acid obtained is a clear, colorless polyacrylic acid having a specific viscosity of 4.8.

After neutralization to pH 8.6 by adding sodium hydroxide at a concentration of 50%, the polyacrylate has a dry matter content of 38% and a residual acrylic acid content of 280 ppm determined on the raw product, according to the analytical method used in the preceding Experiments.

Experiment No. 14

A starting mixture comprising of 600 g of water and one fourth of the total amount of hypophosphorous acid to be employed, said total corresponding to 0.09 g-atom phosphorus per mol acrylic acid to be polymerized, is prepared, at ambient temperature, in a glass 2 L reactor having a stirrer, thermometer, and cooling means.

While the temperature in the starting mixture increases, the two charges to be introduced in parallel over a period of 2 hr are prepared.

The first such charge introduced into a first beaker comprises 972 g of 100% acrylic acid and the remaining three fourths of the total amount of hypophosphorous acid, and the second charge introduced into a second beaker comprises 40 g of hydrogen peroxide, plus 120 g water.

The charges are added to the reactor gradually over a period of 2 hr at 95° C., following which is obtained a polymer solution which is clear and colorless. The polymer is then completely neutralized to a pH of 8.6 by adding sodium hydroxide of concentration 50%. The polyacrylate thus obtained is a homopolymer having a specific viscosity of 0.79 and a dry matter content of 46.6%. The residual content of acrylic acid in the raw product is less than 10 ppm, as determined by the above-described HPLC method.

EXAMPLE 2

The object of this Example is to illustrate an embodiment of the invention in which homopolymers of maleic anhydride are prepared in the absence of any metal or metal salt, particularly in the absence of per salts.

Experiment No. 15

A starting mixture comprising 196 g of maleic anhydride, 288 g of 50% sodium hydroxide, 82 g of sodium hypophosphite, and 130 g water are charged, at ambient temperature, to a glass 2 L reactor having a stirrer, thermometer, and cooling means.

While the temperature in the starting mixture is increased to boiling, a charge comprising 10 g of hydrogen peroxide, plus 130 g water, is prepared. This charge is added to the reactor gradually over a period of 2 hr, with the reactor contents being heated to boiling. Thereafter, a polymer solution is obtained which is clear and colorless.

The polymaleate is a clear, colorless polymaleate having a specific viscosity of 0.12, a dry matter content of 45.2% after neutralization to pH 8.6 with sodium hydroxide of concentration 50%, and a residual maleic anhydride content of 90 ppm determined on the raw product according to the analytical method used in the preceding Experiments.

Experiment No. 16

This experiment is carried out with the same apparatus, the same mode of operation, and the same quantities of reactants as in Experiment 15, with the exception that the amount of the hydrogen peroxide added over a period of 2 hr is doubled.

The polymaleate obtained is clear and colorless, and has a specific viscosity of 0.16. After neutralization to pH 8.6 by adding sodium hydroxide of 50% concentration, the product has a dry matter content of 44.9% and a residual maleic anhydride content of 230 ppm determined on the raw product, according to the analytical method used in the preceding Experiments.

EXAMPLE 3

The object of this Example is to illustrate an embodiment of the invention in which copolymers of acrylic acid and maleic acid are obtained with the use of hydrogen peroxide in the absence of any metal or metal salt.

Experiment No. 17

A copolymer is obtained as follows: A starting mixture comprising 196 g of maleic anhydride, 288 g of 50% sodium hydroxide, 82 g of sodium hypophosphite, and 130 g of water is charged, at ambient temperature, to a glass 2 L reactor having a stirrer, thermometer, and a cooling means. While the temperature in the starting mixture is increased, two charges to be introduced in parallel over a period of 2 hr are prepared.

The first charge is comprised of 84 g of 100% acrylic acid, in a first beaker, and the second charge is comprised of 20 a of hydrogen peroxide, plus 130 g water, in a second beaker. The charges were added to the reactor gradually over a period of 2 hr, with the reactor contents being heated to boiling, following which a polymer solution is obtained which is completely clear and colorless.

The copolymer of the invention has a composition of monomer units corresponding to 30 wt. % acrylic acid and 70 wt. % maleic anhydride, and has a specific viscosity of 0.18. After neutralization to pH 8.6 by adding sodium hydroxide of concentration 50%, a dry matter content of 52.2% is obtained. The residual content of maleic anhydride is 300 ppm determined on the raw product, according to the analytical method used in the preceding Experiments. The corresponding figure for residual acrylic acid is 20 ppm.

Experiment No. 18

The purpose of this Experiment is to illustrate a different monomer ratio than in the preceding Experiment.

The starting mixture has the same reactants as in the preceding Experiment, and in the same amounts, except that the amount of sodium hypophosphite is 18.38 wt. %, based on the total weight of the monomers plus the sodium hypophosphite. The two charges are introduced under the same operating conditions and using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 46 wt. % acrylic acid and 54 wt. % maleic anhydride. The amount of the second (hydrogen peroxide containing) charge remains the same as in Experiment No. 17.

The copolymer of the invention is obtained as a clear, colorless solution of 46 wt. % acrylic acid units, and 54 wt. % maleic anhydride units having a specific viscosity of 0.23. After neutralization to pH 8.6 by adding sodium hydroxide of a concentration of 50%, the solution has a dry matter content of 50.8%, and a residual maleic anhydride content of 300 ppm determined on the raw product, according to the analytical method used in the preceding Experiments. The corresponding figure for residual acrylic acid is 30 ppm.

Experiment No. 19

The purpose of this Experiment was to illustrate a different monomer ratio.

The starting mixture has the same reactants as in the preceding Experiment, and in the same amounts, except that the amount of sodium hypophosphite is 14.48 wt. % based on the total weight of the monomers plus the sodium hypophosphite. The two charges are introduced under the same operating conditions using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 60 wt. % acrylic acid and 40 wt. % maleic anhydride. The amount of the second (hydrogen peroxide containing) charge remains the same as in Experiment No. 17.

The copolymer of the invention is obtained as a clear, colorless solution of 60 wt. % acrylic acid units, and 40 wt. % maleic anhydride units having a specific viscosity of 0.31. After neutralization to pH 8.6 by adding sodium hydroxide at a concentration of 50%, the solution has a dry matter content of 52.5%, and a residual maleic anhydride content of 207 ppm determined on the raw product, according to the analytical method used in the preceding Experiments. The corresponding figure for residual acrylic acid is 20 ppm.

Experiment No. 20

The purpose of this Experiment is to illustrate a different monomer ratio.

The starting mixture has the same reactants as in the preceding Experiment, and in the same amounts, except that the amount of sodium hypophosphite is 12.5 wt. %, based on the total weight of the monomers plus the sodium hypophosphite. The two charges are introduced under the same operating conditions using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 66.7 wt. % acrylic acid and 33.3 wt. % maleic anhydride. The amount of the second (hydrogen peroxide containing) charge remains the same as in Experiment No. 17.

The copolymer of the invention is obtained as a clear, colorless solution of 66.7 wt. % acrylic acid units and 33.3 wt. % maleic anhydride units having a specific viscosity of 0.33. After neutralization to pH 8.6 by adding sodium hydroxide at a concentration 50%, the solution has a dry matter content of 43.8%, and a residual maleic anhydride content of 120 ppm determined on the raw product, according to the analytical method used in the preceding Experiments. The corresponding figure for residual acrylic acid is 50 ppm.

Experiment No. 21

The purpose of this Experiment was to illustrate a different monomer ratio.

The starting mixture has the same reactants as in the preceding Experiment, and in the same amounts, except that the amount of sodium hypophosphite is 9.67 wt. %, based on the total weight of the monomers plus the sodium hypophosphite. The two charges are introduced under the same operating conditions using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 75 wt. % acrylic acid and 25 wt. % maleic anhydride. The amount of the second (hydrogen peroxide containing) charge remains the same as in Experiment No. 17.

The copolymer of the invention is obtained as a clear, colorless solution of 75 wt. % acrylic acid units and 25 wt. % maleic anhydride units having a specific viscosity of 0.46. After neutralization to pH 8.6 by adding sodium hydroxide at a concentration of 50%, the solution has a dry matter content of 40.0%, and a residual maleic anhydride content of 95 ppm determined on the raw product, according to the analytical method used in the preceding Experiments. The corresponding figure for residual acrylic acid is 40 ppm.

Experiment No. 22

The purpose of this Experiment is to illustrate a different monomer ratio.

The starting mixture has the same reactants as in the preceding Experiment, and in the same amounts, except that the amount of sodium hypophosphite is 7.24 wt. %, based on the total weight of the monomers plus the sodium hypophosphite. The two charges are introduced under the same operating conditions using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 83 wt. % acrylic acid and 17 wt. % maleic anhydride. The amount of the second (hydrogen peroxide containing) charge remained the same as in Experiment No. 17.

The copolymer of the invention is obtained as a clear, colorless solution of 83 wt. % acrylic acid units and 17 wt. % maleic anhydride units having a specific viscosity of 0.57. After neutralization to pH 8.6 by adding sodium hydroxide at a concentration of 50%, the solution has a dry matter content of 41.8%, and a residual maleic anhydride content of 53 ppm determined on the raw product, according to the analytical method used in the preceding Experiments. The corresponding figure for residual acrylic acid is 52 ppm.

Experiment No. 23

The purpose of this Experiment is to illustrate a different monomer ratio.

The starting mixture has the same reactants as in the preceding Experiment, and in the same amounts, except that the amount of sodium hypophosphite was 6.1 wt. %, based on the total weight of the monomers plus the sodium hypophosphite. The two charges are introduced under the same operating conditions using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 85 wt. % acrylic acid and 15 wt. % maleic anhydride. The amount of the second (hydrogen peroxide containing) charge remained the same as in Experiment No. 17.

The copolymer of the invention is obtained as a clear, colorless solution of 85 wt. % acrylic acid units and 15 wt. % maleic anhydride units having a specific viscosity of 0.77. After neutralization to pH 8.6 by adding sodium hydroxide at a concentration of 50%, the solution has a dry matter content of 41.8%, and a residual maleic anhydride content of 60 ppm determined on the raw product, according to the analytical method used in the preceding Experiments. The corresponding figure for residual acrylic acid is 35 ppm.

Experiment No. 24

The purpose of this Experiment is to illustrate a different monomer ratio.

The starting mixture has the same reactants as in the preceding Experiment, and in the same amounts, except that the amount of sodium hypophosphite is 5.77 wt. %, based on the total weight of the monomers plus the sodium hypophosphite. The two charges are introduced under the same operating conditions and using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 85.7 wt. % acrylic acid and 14.3 wt. % maleic anhydride. The amount of the second (hydrogen peroxide containing) charge remained the same as in Experiment No. 17.

The copolymer of the invention is obtained is as a clear, colorless solution of 85.7 wt. % acrylic acid units and 14.3 wt. % maleic anhydride units having a specific viscosity of 1.55. After neutralization to pH 8.6 by adding sodium hydroxide at a concentration of 50%, the solution has a dry matter content of 47.4%, and a residual maleic anhydride content of 70 ppm determined on the raw product, according to the analytical method used in the preceding Experiments. The corresponding figure for residual acrylic acid is 235 ppm.

Experiment No. 25

The purpose of this Experiment is to illustrate a different monomer ratio, and also a procedure wherein the amount of sodium hydroxide at a concentration of 50% employed in the starting mixture was reduced by one half.

The starting mixture has the same reactants as in the preceding Experiment, and in the same amounts, except that:
  the amount of sodium hypophosphite is 11.2 wt. %, based on the total weight of the monomers plus the sodium hypophosphite, and
  the amount of sodium hydroxide at a concentration of 50% employed in the starting mixture is reduced by one half.

The two charges are introduced under the same operating conditions and using the same apparatus as in Experiment No. 17. Here, as well, the first charge is comprised of acrylic acid at a concentration of 100%, and the second charge is comprised of hydrogen peroxide and water. However, here the amount of 100% acrylic acid is such as to provide weight proportions of the monomers of 70.6 wt. % acrylic acid and 29.4 wt. % maleic anhydride. The amount of the second (hydrogen peroxide containing) charge remained the same as in Experiment No. 17.

The copolymer of the invention is obtained as a clear, colorless solution of 70.6 wt. % acrylic acid units and 29.4 wt. % maleic anhydride units having a specific viscosity of 0.39. After neutralization to pH 8.6 by adding sodium hydroxide at a concentration of 50%, the solution has a dry matter content of 45%, and a residual maleic anhydride content of 120 ppm determined on the raw product, according to the analytical method used in the preceding Experiments. The corresponding figure for residual acrylic acid is 110 ppm.

EXAMPLE 4

The object of this Example is to illustrate the possibility of varying the specific viscosity, for a copolymer of given monomeric composition.

Experiment No. 26

The method used and the monomer composition employed are the same as in Experiment No. 23, but:
- the amount (by weight) of sodium hypophosphite is increased by a factor of 1.5, one fourth of which amount is introduced in the starting mixture and three fourths of which is introduced in the parallel addition of charges; and
- the amount of the hydrogen peroxide is increased by a factor of 4.

The copolymer of the invention is obtained as a clear, colorless solution of 85 wt. % acrylic acid units and 15 wt. % maleic anhydride units having a specific viscosity of 0.44. After neutralization to pH 8.6 by adding sodium hydroxide at a concentration of 50%, the solution has a dry matter content of 47.0%, and a residual maleic anhydride content of 10 ppm determined on the raw product, according to the analytical method used in the preceding Experiments. The corresponding figure for residual acrylic acid is also c. 10 ppm.

Experiment No. 27

The method used and the monomer composition employed are the same as in the preceding Experiment, but:
- the amount (by weight) of sodium hypophosphite is reduced by a factor of 3; and the amount of the hydrogen peroxide is reduced by a factor of 2.

The copolymer of the invention is obtained as a clear, colorless solution of 85 wt. % acrylic acid units and 15 wt. % maleic anhydride units having a specific viscosity of 1.26. After neutralization to pH 8.6 by adding sodium hydroxide at a concentration of 50%, the solution has a dry matter content of 43.6%, and a residual maleic anhydride content of 140 ppm determined on the raw product, according to the analytical method used in the preceding Experiments. The corresponding figure for residual acrylic acid is also 140 ppm.

EXAMPLE 5

This Example illustrates the manufacture of other copolymers of the invention.

Experiment No. 28

An acrylic acid-methacrylic acid copolymer is produced by the same method as used in Experiment No. 17, with the addition of a charge comprising acrylic acid and a charge comprising hydrogen peroxide plus water, to a reactor containing water, methacrylic acid, sodium hypophosphite, and a certain amount of 50% sodium hydroxide. The component amounts are adjusted such that the polymer obtained following the addition of reactants over a period of 2 hr under reflux is a clear, colorless copolymer of the invention having 13 wt. % methacrylic acid units and 87 wt. % acrylic acid units and a specific viscosity of 0.84, a dry matter content of 50.4% after neutralization to pH 8.6 by adding sodium hydroxide at a concentration of 50%, and a residual methacrylic acid content of less than 10 ppm determined on the raw product, according to the analytical method used in the preceding Experiments. The corresponding figure for residual acrylic acid is also less than 10 ppm.

Experiment No. 29

To produce an acrylic acid-methacrylic acid copolymer, over a period of 2 hr, under reflux, two charges are introduced to a reactor initially containing 456 g water and 25% of the total amount of sodium hypophosphite to be employed, which total amount corresponds to 0.064 g-atom phosphorus per mol of monomers to be polymerized. One such charge comprises 25 g of hydrogen peroxide, plus 75 g water. The other charge comprises 300 g acrylic acid, 300 g methacrylic acid, and the remaining 75% of the total amount of sodium hypophosphite to be employed.

The copolymer of the invention is obtained following the addition over a period of 2 hr under reflux as a clear, colorless copolymer of 50% acrylic acid and 50% methacrylic acid having a specific viscosity of 1.0, a dry matter content of 38.6% after neutralization to pH 8.6 by adding sodium hydroxide at a concentration of 50%, and a residual acrylic acid content of 30 ppm determined on the raw product, according to the analytical method used in the preceding Experiments. The corresponding figure for residual methacrylic acid is less than 10 ppm.

Experiment No. 30

A maleic anhydride-methacrylic acid copolymer is produced by the same method as used in Experiment No. 19, but the acrylic acid of Experiment No. 19 is replaced by methacrylic acid. The polymer obtained following the addition over a period of 2 hr under reflux is a clear, colorless copolymer of the invention having 60 wt. % methacrylic acid units and 40 wt. % maleic anhydride units and having a specific viscosity of 0.32, a dry matter content of 46.2% after neutralization to pH 8.6 by adding sodium hydroxide at a concentration of 50%, and a residual methacrylic acid content of 28 ppm determined on the raw product, according to the analytical method used in the preceding Experiments. The corresponding figure for residual maleic anhydride is 200 ppm.

Experiment 31

This Experiment illustrates the production of an acrylic acid-acrylamide copolymer.

A starting mixture comprises 200 g water and one fourth of the total amount of sodium hypophosphite to be employed, said total corresponding to 0.059 g-atom phosphorus per mol of monomers to be polymerized. The mixture is prepared, at ambient temperature in a glass 2 L reactor having a stirrer, thermometer, and cooling means.

While the temperature of the starting mixture is increased, the two charges to be introduced in parallel over a period of 2 hr are prepared.

The first charge comprises 181 g of 100% acrylic acid, 844 g of acrylamide of 50% concentration, and the remaining three fourths of the total amount of sodium hypophosphite, which is placed in a first beaker.

The second charge comprises 25 g of hydrogen peroxide, mixed with an additional 75 g water, the second charge being introduced into a second beaker.

These charges are added to the reactor gradually over a period of 2 hr, with the reactor contents being heated to boiling, following which a polymer in a solution is obtained which is clear and colorless.

The product obtained is a copolymer of the invention of 30 wt. % acrylic acid units and 70 wt. % acrylamide units having a specific viscosity of 0.37, a dry matter content of 45.3% after neutralization to pH 8.6 by adding sodium hydroxide at a concentration of 50%, and a residual acrylic acid content of 30 ppm determined on the raw product, according to the analytical method used in the preceding Experiments. The corresponding figure for residual acrylamide is less than 10 ppm.

Experiment 32

This Experiment illustrates an acrylic acid-sodium methallyl sulfonate copolymer. A starting mixture, comprised of: 185 g water, the total amount of sodium hypophosphite to be employed, corresponding to 0.045 g-atom phosphorus per mol of monomers to be polymerized, and 145 g of 100% sodium methallyl sulfonate (MTAS), is prepared, at ambient temperature, in a glass 2 L reactor having a stirrer, thermometer, and cooling means.

While the temperature in the starting mixture is increased, the two charges to be introduced in parallel over a period of 2 hr are prepared.

The first charge comprises 512 g of 100% acrylic acid, and is introduced into a first beaker.

The second charge comprises 20 g of hydrogen peroxide, mixed with an additional 180 g water, the second charge being introduced into a second beaker.

These charges are added to the reactor gradually over a period of 2 hr, with the reactor contents being heated to boiling, following which a polymer in a solution is obtained which is clear and colorless.

The product obtained is a copolymer of the invention of 78 wt. % acrylic acid units and 12 wt. % MTAS units having a specific viscosity of 1.19, a dry matter content of 51.5% after neutralization to pH 8.6 by adding sodium hydroxide at a concentration of 50%, and a residual acrylic acid content of less than 10 ppm determined on the raw product, according to the analytical method used in the preceding Experiments. The corresponding figure for residual MTAS is also less than 10 ppm.

Experiment No. 33

An acrylic acid-ethyl acrylate copolymer is produced with the same apparatus and by the same method as used in Experiment No. 31, but the 844 g of 50% acrylamide is replaced by 61 g of ethyl acrylate, and the 181 g of 100% acrylic acid is replaced by 549 g of 100% acrylic acid. The product obtained is a copolymer of the invention of 90 wt. % acrylic acid units and 10 wt. % ethyl acrylate units having a specific viscosity of 0.59, a dry matter content of 46.7% after neutralization to pH 8.6 by adding sodium hydroxide at a concentration of 50%, and a residual acrylic acid content of less than 10 ppm determined on the raw product, according to the analytical method used in the preceding Experiments. The corresponding figure for residual ethyl acrylate is also less than 10 ppm.

Experiment No. 34

An acrylic acid-ethyl acrylate copolymer is produced with the same apparatus and by the same method as used in Experiment No. 33, but the proportions of the amounts of the monomers are changed to 70 wt. % acrylic acid and 30 wt. % ethyl acrylate.

The product obtained is a copolymer of the invention of 70 wt. % acrylic acid units and 30 wt. % ethyl acrylate units having a specific viscosity of 0.61, a dry matter content of 50.6% after neutralization to pH 8.6 by adding sodium hydroxide at a concentration of 50%, and a residual acrylic acid content of 10 ppm determined on the raw product, according to the analytical method used in the preceding Experiments. The corresponding figure for residual ethyl acrylate is 15 ppm.

Experiment No. 35

An acrylic acid-butyl acrylate copolymer is produced with the same apparatus and by the same method as used in Experiment No. 33, but the ethyl acrylate is replaced by an equal weight of butyl acrylate.

The product obtained is a copolymer of the invention of 90 wt. % acrylic acid units and 10 wt. % butyl acrylate units having a specific viscosity of 0.59, a dry matter content of 48.29% after neutralization to pH 8.6 by adding sodium hydroxide at a concentration of 50%, and a residual acrylic acid content of less than 10 ppm determined on the raw product, according to the analytical method used in the preceding Experiments. The corresponding figure for residual ethyl acrylate is also less than 10 ppm.

Experiment No. 36

An acrylic acid-methyl methacrylate copolymer is produced with the same apparatus and by the same method as used in the preceding Experiment, but the butyl acrylate is replaced by an equal weight of methyl methacrylate.

The product obtained was a copolymer of the invention of 90 wt. % acrylic acid units and 10 wt. % methyl methacrylate units having a specific viscosity of 0.64, a dry matter content of 46.2% after neutralization to pH 8.6 by adding sodium hydroxide at a concentration of 50%, and a residual acrylic acid content of less than 10 ppm determined on the raw product, according to the analytical method used in the preceding Experiments. The corresponding figure for residual methyl methacrylate is also less than 10 ppm.

Experiment 37

This Experiment illustrates production of an acrylic acid-acrylamide-ethylene glycol methacrylate phosphate terpolymer.

A starting mixture, comprised of 370 g water, and
one fourth of the total amount of sodium hypophosphite to be employed, the total corresponding to 0.066 g-atom phosphorus per mol of monomers to be polymerized, is prepared, at ambient temperature, in a glass 2 L reactor having a stirrer, thermometer, and cooling means.

While the temperature in the starting mixture is increased, the two charges to be introduced in parallel over a period of 2 hr are prepared.

The first charge comprises 305 g of 100% acrylic acid, 99.6 g of hydrolyzed ethylene glycol methacrylate phosphate, 260.6 g of 50% acrylamide, 100 g of water, and the remaining three fourths of the total amount of sodium hypophosphite, which are introduced into a first beaker.

The second charge comprises 44 g of hydrogen peroxide, mixed with an additional 66 g of water, the second charge being introduced into a second beaker.

These charges are added to the reactor gradually over a period of 2 hr, with the reactor contents being heated to boiling, following which a polymer in a solution is obtained which is clear and colorless.

The product obtained is a copolymer of the invention of 57 wt. % acrylic acid units, 19 wt. % acrylamide units, and 24 wt. % ethylene glycol methacrylate phosphate units having a specific viscosity of 0.48, a dry matter content of 41.9% after neutralization to pH 8.6 by adding sodium hydroxide at a concentration of 50%, and a residual content of the monomers of less than 10 ppm determined on the raw product, according to the analytical method used in the preceding Experiments.

Experiment No. 38

An acrylic acid-acrylamide-ethylene glycol methacrylate phosphate terpolymer is produced with the same apparatus and by the same general method as used in Experiment No. 37, but with less sodium hypophosphite. That is, the total amount of sodium hypophosphite employed in the present Experiment corresponds to 0.025 g-atom phosphorus per mol of monomers to be polymerized.

The product obtained is a copolymer of the invention of 57 wt. % acrylic acid units, 19 wt. % acrylamide units, and 24 wt. % ethylene glycol methacrylate phosphate units having a specific viscosity of 1.0, a dry matter content of 43% after neutralization to pH 8.6 by adding sodium hydroxide at a concentration of 50%, and a residual content of the monomers of less than 10 ppm determined on the raw product, according to the analytical method used in the preceding Experiments.

EXAMPLE 6

This Example illustrates the use of polymers of the invention as dispersant(s) for mineral materials in aqueous media, particularly for dispersing kaolin in water.

In each of the following Experiments, 500 g kaolin is introduced into a 1 L beaker containing 258 g water, 1.10 g (dry basis) of the dispersant being tested, and sufficient 50% sodium hydroxide to adjust the pH to c. 7.2–7.5. The kaolin is introduced by gradual sprinkling into the mixture under agitation.

Experiment No. 39

This Experiment was a control experiment in which no dispersant is present in the beaker.

Experiments 40 to 44

In these Experiments, the invention is illustrated by using, as dispersants, the present copolymers prepared in Experiments Nos. 19, 21, 22, and 23, and the present homopolymer prepared in Experiment No. 9, with each dispersant being neutralized to pH 8.6 by adding sufficient sodium hydroxide at a concentration of 50%. After agitation for 45 min, the Brookfield viscosities are measured at ambient temperature, with the aid of a Brookfield type RVT viscometer at 100 rpm.

The results of the measurements of the Brookfield viscosity of the aqueous suspensions of kaolin are presented in Table 1.

TABLE 1

| | | Dispersant Used | | |
|---|---|---|---|---|
| | Experiment No. | Type of Dispersant Used | Amount of Dispersant Used (Wt. % Dry Basis/dry Basis) | Dry Matter in the Slurry (%) | Brookfield Viscosities (mPa-sec) |
| Control | 39 | — | 0 | 66.0 | >100,000 |
| Invention | 40 | Copolymer of Exp. 19 | 0.22 | 66.4 | 500 |
| Invention | 41 | Copolymer of Exp. 21 | 0.22 | 66.2 | 650 |
| Invention | 42 | Copolymer of Exp. 22 | 0.22 | 66.0 | 745 |
| Invention | 43 | Copolymer of Exp. 23 | 0.22 | 66.0 | 1220 |
| Invention | 44 | Copolymer of Exp. 9 | 0.22 | 66.0 | 410 |

It can be seen from Table 1 that the present copolymers can be used to provide aqueous dispersions of kaolin which are industrially useful, thus demonstrating the suitability of the copolymers as dispersants for mineral materials.

EXAMPLE 7

This Example illustrates the use of polymers of the invention, produced by the present method, as dispersant(s) for mineral materials in aqueous media for use in the paper industry, particularly for dispersing calcium carbonate in water.

In each of the Experiments 45 to 48, using the same method as in the preceding Example, calcium carbonate of a particle size distribution such that 75% of the particles have diameters less than 1 micron are employed in an amount such that the dry matter concentration achieved is 72%, and the given dispersant is employed in the amount of 0.75 wt. % dry basis dry basis, based on the weight of the calcium carbonate.

In each of the Experiments, a different dispersant is tested.

Experiment No. 45

This Experiment is a control experiment in which no dispersant is present in the beaker.

Experiments 46 to 48

In these Experiments, the invention is illustrated by using as dispersants the present copolymers prepared in Experiments Nos. 24, 23, and 22, with each dispersant being neutralized to pH 8.6 by adding sufficient sodium hydroxide at a concentration of 50%.

After agitation for 45 min, the Brookfield viscosities are measured at ambient temperature, with the aid of a Brookfield type RVT viscometer at 10 rpm and 100 rpm.

The results of the measurements of the Brookfield viscosity of the aqueous suspensions of calcium carbonate are presented in Table 2.

TABLE 2

| | | Dispersant Used | | | |
|---|---|---|---|---|---|
| | Experiment No. | Type of Dispersant Used | Amount of Dispersant Used (wt. %, dry basis/dry basis) | Dry Matter in the Slurry (wt. %) | Brookfield Viscosities (mPa · s) |
| Control | 45 | — | 0 | 72 | >100,000  >100,000 |
| Invention | 46 | Copolymer of Exp. 24 | 0.75 | 72 | 650  310 |
| Invention | 47 | Copolymer of Exp. 23 | 0.75 | 72 | 5500  955 |
| Invention | 48 | Copolymer of Exp. 22 | 0.75 | 72 | 19000  2100 |

Similarly, in Experiments Nos. 49 to 54, using the same method as in the preceding Example, precipitated calcium carbonate supplied by the firm Solvay under the tradename "Socal P3" is employed in an amount such that the dry matter concentration achieved is 70%, and the given dispersant is employed in the amount of 0.7 wt. %, dry basis/dry basis, based on the weight of the calcium carbonate.

In each of the Experiments, a different dispersant is tested.

Experiment No. 49

This Experiment is a control experiment in which no dispersant is present in the beaker.

Experiments 50 to 54

In these Experiments, the invention is illustrated by using as dispersants the present copolymers prepared in Experiments Nos. 21 to 24, and the inventive homopolymer prepared in Experiment No. 9, with each dispersant being neutralized to pH 8.6 by adding sufficient sodium hydroxide at a concentration of 50%.

After agitation for 45 min, the Brookfield viscosities are measured at ambient temperature, with the aid of a Brookfield type RVT viscometer at 100 rpm.

The results of the measurements of the Brookfield viscosity of the aqueous suspensions of "Socal P3" are presented in Table 3.

TABLE 3

| | | Dispersant | | |
|---|---|---|---|---|
| | Experiment No. | Type | Amount of dispersant used (wt. %, Dry basis/dry basis) | Dry Matter in the Slurry (%) | Brookfield viscosities (mPa-sec) 100 T/mn |
| Control | 49 | — | 0 | 70 | >100,000 |
| Invention | 50 | Copolymer of Exp. 21 | 0.7 | 70 | 920 |
| Invention | 51 | Copolymer of Exp. 22 | 0.7 | 70 | 870 |
| Invention | 52 | Copolymer of Exp. 23 | 0.7 | 70 | 720 |
| Invention | 53 | Copolymer of Exp. 24 | 0.7 | 70 | 580 |
| Invention | 54 | Copolymer of Exp. 9 | 0.7 | 70 | 760 |

Tables 2 and 3 show the effectiveness of the present copolymers as dispersants for mineral materials.

EXAMPLE 8

This Example relates to a preparation of a suspension of calcium carbonate of relatively large particle size which is comminuted to form a microparticulate suspension.

Various coarse calcium carbonate suspensions are prepared from natural calcium carbonate of mean particle size 50 micron, as follows:

For Experiment No. 55 (control experiment): Simple 25% suspension in water, with no dispersant added.

For Experiment No. 56 (invention): The polyacrylate from Experiment No. 5, completely neutralized with sodium hydroxide and magnesium hydroxide in a ratio corresponding to a neutralization of 50% sodium-50% magnesium, is added as a dispersant.

For Experiment No. 57 (invention): The polyacrylic acid from Experiment No. 9, completely neutralized with sodium hydroxide and magnesium hydroxide in a ratio corresponding to a neutralization of 50% sodium-50% magnesium, is added as a dispersant.

For Experiment No. 58 (invention): The polyacrylic acid from Experiment No. 5, completely neutralized with sodium hydroxide and calcium hydroxide in a ratio corresponding to a neutralization of 70% sodium-30% calcium, is added as a dispersant.

For Experiment No. 59 (invention): The polyacrylic acid from Experiment No. 9, completely neutralized with sodium hydroxide and calcium hydroxide in a ratio corresponding to a neutralization of 70% sodium-30% calcium, is added as a dispersant.

For each Experiment, an aqueous suspension of calcium carbonate from the Orgon deposit in France is prepared which has a particle sizes less than 10 micron.

The aqueous suspension has a dry matter content 76 wt. %, based on the total weight of the suspensions, with the exception of the control suspension which has a dry matter content of 25 wt. %.

The milling agent is introduced into the suspension in the amount indicated in Table 4 which are units of wt. %, based on dry weight of the milling agent per dry weight of the calcium carbonate being comminuted.

The suspension is circulated in a comminuting mill of type "Dyno-Mill" with a fixed cylinder and rotating rotor, wherein the comminuting bodies comprise Corundum spheres of diameters in the range of 0.6 mm to 1.0 mm.

The total volume occupied by the comminuting bodies is 1,150 cc, and the total weight of the comminuting bodies is 2,900 g.

The mill chamber has a volume of 1,400 cc.

The circumferential speed of the mill is 10 m/sec.

The suspension of calcium carbonate is recycled at 18 L/hr.

The outlet of the "Dyno-Mill" mill is equipped with a separator of mesh 200 micron, which permits removal of the comminuting bodies from the suspension resulting from the milling.

During each milling run, the temperature is maintained at c. 60° C.

At the end of the milling run (time To), a sample of the pigment suspension having 80% of the particles of particle size less than 1 micron is recovered in a flask. The viscosity of this sample is measured with a Brookfield type RVT viscometer, at 20° C. and speeds 10 rpm and 100 rpm, with a suitable rotor. This provided the "viscosity at To".

After the suspension is allowed to settle in the flask for 8 da, a suitable rotor for a Brookfield type RVT viscometer is introduced into the quiescent contents in the flask, and the viscosity of the suspension is measured again, at 20° C. and speeds 10 rpm and 100 rpm. This provides the "viscosity prior to agitation".

The flask is then agitated, following which the viscosity is measured a third time by the same means. This provides the "viscosity following agitation".

All of these experimental results are shown in Table 4.

TABLE 4

| | Experiment No. | Concentration of the Suspension [dry matter] [wt. %] | Milling Agent Specific viscosity | Consumption of Milling agent (wt. % (dry/dry)) | Brookfield Viscosity of the Suspension (at 20° C. in mPa · s) | | |
|---|---|---|---|---|---|---|---|
| | | | | | To 10 T/min–100 T/min | 8 Days AVAG 10 T/min–100 T/min | 8 Days APAG 10 T/min–100 T/min |
| Control | 55 | 25 | — | — | 800–450 | 20,000–2500 | 1200–650 |
| Invention | 56 | 76 | 0.53 | 0.98 | 1080–330 | 2060–620 | 820–280 |
| Invention | 57 | 76 | 0.53 | 1.10 | 950–290 | 1400–450 | 900–275 |
| Invention | 58 | 76 | 0.53 | 0.95 | 1030–330 | 7600–1300 | 930–320 |
| Invention | 59 | 76 | 0.53 | 0.99 | 1930–570 | 10,000–1660 | 1400–450 |

AVAG: Measured viscosity before agitation of the suspension
APAG: Measured viscosity after agitation of the suspension It can be seen from Table 4 that the present polymers are effective as milling agents for aqueous suspensions of mineral materials which suspensions have high dry matter concentrations.

EXAMPLE 9

This Example shows the use of various polymers of the invention in flat (matt) water-based interior paints. The effectiveness of the polymers as dispersants and their ability to increase the water-resistance of the dried film are tested, by way of evaluating the rheological stability and water-resistance of the various flat interior paints prepared.

In each Experiment, other than the Control, 160 g water and 1 g 28% ammonium hydroxide are added to a vessel in which is added 0.06 wt. % of the dispersant being tested on a dry basis, based on the total weight of the given flat water-based paint formulation.

After several seconds of agitation following the introduction of the dispersant copolymer into the aqueous ammonium hydroxide, the other components of the flat water-based paint formulation are added in succession, as follows:

2 g "MERGAL K6N", a biocide sold commercially by the firm Riedel de Haen;

1 g "BYK 03411, a defoamant sold commercially by the firm Byk;

41 g "RL 68", a rutile (titanium dioxide) sold commercially by the firm Thann et Mulhouse;

327.9 g "DURCAL 2", a natural calcium carbonate sold commercially by the firm Omya;

215.2 g "HYDROCARB", a natural calcium carbonate sold commercially by the firm Omya;

82 g "RHODOPAS DS 910", a styrene-acrylic binder in the form of a dispersion, sold commercially by the firm Rhone-Poulenc;

10.2 g monoethylene glycol;

10.2 g white spirits of petroleum;

1.3 g 28% ammonium hydroxide;

13.6 g "VISCOATEX 46", a thickener sold commercially by the firm Coatex; and sufficient water to provide a total formulation weight of 1000 g.

Various dispersants are tested, as follows:

Experiment No. 60

This Experiment is a control experiment, in which no dispersants are used.

Experiments Nos. 61 to 64

In these Experiments, which illustrate the invention, the copolymers from Experiments Nos. 17, 19, 20, and 23, respectively, are employed.

For each Experiment, the aqueous formulation is agitated for several minutes, following which the Brookfield viscosity is measured at 25° C. with a type RVT Brookfield viscometer equipped with a suitable rotor, at 10 rpm.

The rheological stabilities of the formulations over time, and with elevated temperature, are determined by measurement of the Brookfield viscosities (25° C., 10 rpm) of the formulations after storage at ambient temperature without agitation for 24 hr; then after storage 1 wk in a heated cabinet at 50° C.; and then after storage 1 mo in the same cabinet at 50° C.

In the course of preparing the formulations for the Experiments, the dimension of the vortex present around the stirring axis is evaluated visually during the entire period of addition of the charges and/or mineral pigments, and the various additives, with the aim of estimating the ease of mixing of the formulation. Such ease of mixing is an indication (or aspect) of the effectiveness of the dispersant agent.

In Table 5, infra, in which all of the results obtained for the different Experiments are reported, the following codes are used for the observations relating to "ease of mixing":

TB (very good): The vortex is of constant dimension and shape during the entire incorporation of the charges and/or mineral pigments; this indicates excellent fluidity of the resulting composition.

B (good): The dimension of the vortex decreases slightly during the incorporation of the charges and/or mineral pigments.

AB (adequate): The dimension of the vortex change appreciably during the incorporation of the charges and/or mineral pigments; nonetheless it is possible to achieve thorough intermixing of the various components of the formulation.

M (poor): For the Control experiment, this indicates that the vortex around the stirring axis completely disappeared, resulting in poor mixing of the medium.

After the rheological behavior of the various flat interior paints is measured, the resistance to abrasion of the dried films under wet conditions is tested by the German standard DIN 53778 Part 2, for each of the Experiments.

In this test, carried out with a Gardner model "M 105-A" abrasimeter (conforming to DIN 53778), the number of revolutions made by a brush calibrated according to DIN 53778 in abrading a previously dried film of the paint to a depth of 100 micron is measured. The sample is prepared by drying the film on a "LENETA" board. The test is conducted in the presence of a detergent solution, to test complete abrasion of the paint film.

The results are presented in Table 5.

TABLE 5

| | Experiment No. | Dispersant (dry) (wt. %) | Brookfield Viscosity of the Paint Formulation (mPa-sec) | | | | Ease of mixing | Abrasion resistance while wet according to DIN 53778 |
| --- | --- | --- | --- | --- | --- | --- | --- | --- |
| | | | At Time T = 0 | At time T = 24 hr. | At time T = 1 wk at 50° C. | At time T = 1 mo. at 50° C. | | |
| Control | 60 | 0 | 21,000 | 34,000 | 66,000 | 68,000 | M | 500 |
| Invention | 61 | 0.06 | 17,500 | 15,500 | 47,000 | 58,000 | AB | 660 |
| | 62 | 0.06 | 16,500 | 11,000 | 34,000 | 44,000 | B | 750 |
| | 63 | 0.06 | 17,000 | 14,000 | 32,000 | 38,000 | TB | 750 |
| | 64 | 0.06 | 16,500 | 14,500 | 22,000 | 30,000 | TB | 750 |

From Table 5 it may be concluded that the flat water-based interior paints containing the polymers of the invention provide:

good rheologic stability (Brookfield viscosity at 10 rpm at 25° C. after 1 mo storage at 50° C. is less than 60,000 mPa-sec); and ease of mixing rated at least adequate to good ("AB");

whereas the control formulation without a dispersant does not provide these benefits. Further, the abrasion resistance under wet conditions is appreciably greater with the present formulations than with the control formulation.

EXAMPLE 10

This Example illustrates the use of polymers of the invention as anti-scaling agent(s) in water treatment. Measurements are made of the retardation of precipitation of alkaline earth ions, particularly precipitation of the calcium carbonate present in natural and artificial waters of varying salt content, in the presence of the polymers.

In each Experiment, municipal tap water containing 5 ppm of one of the polymers being tested is added to a 1 L flask equipped with cooling means, which includes a reflux condenser, except that in Experiment No. 65 and the Control experiment, the tap water used did not contain any polymer.

Experiments Nos. 66 and 67 illustrate the invention with the use of the copolymers of Experiments Nos. 21 and 20, respectively.

The water charge as described is heated to boiling, under reflux. At time t=0, defined as the time at which the first ring of bubbles appeared (onset of boiling), a sample of volume 20 mL is taken. The water is then immediately filtered through a 0.45 micron "Millipore" filter, and the filtrate is transferred to a 100 mL beaker to be titrated with EDTA. The beaker had previously been charged with 3 mL of a concentrated ammoniacal indicator buffer, "Merck 108430", which is stirred in the beaker with the aid of a magnet bar stirrer. The mixture is agitated for several seconds, and then 5.10–3 M EDTA is added gradually from a burette, until the mixture turned a strong green color. The water hardness determined (hydrotimetric titer, "HT"), in units of French degrees of hardness (1 French degree=10 mg of $CaCO_3$ equivalent per liter of water) is given as follows:

HT (°French)=Volume of EDTA added×2.5. The value for HT determined at this point is designated "HT 0". Corresponding additional samples are taken after 15 minutes of boiling (t=15 min) and 30 minutes of boiling (t=30 min). The values for HT determined are designated "HT 15" and "HT 30", respectively. The data are reported in Table 6.

Once this mixture is thoroughly intermixed, 5 g of the polymer to be tested in situ is added, under agitation, except that in Experiment No. 65, the control experiment, no polymer is added.

After the resulting mixture is cooled, 10 mL of this mixture is added to 100 mL water.

After thus diluting the mixture, a 20 mL sample of the diluted chlorine-containing alkaline composition is taken and is subjected to analysis to determine the hypochlorite present.

The analysis is by the Bunsen method based on oxidation of iodide ions by hypochlorite ions, to generate iodine, which is titrated with 0.1 N sodium thiosulfate solution. The chlorometric index, "°Cl", of the chlorine-containing alkaline composition, is then calculated from the titer.

For the 20 mL sample referred to, the chlorometric index is given by:

$$°Cl = \frac{\text{Volume of sodium thiosulfate}}{20} \times 11.2$$

The value of the chlorometric index obtained in Experiment No. 68 (Control experiment) is then taken as a reference value, to represent 100% of the hypochlorite present in the formulation.

The various Experiments are as follows:

Experiment No. 68

Control experiment. No polymer used.

TABLE 6

|  | Experiment No. | Anti-scaling Agent | Hydrotimetric titer at time t = 0 min | Hydrotimetric titer at time t = 15 min | Hydrotimetric titer at time t = 30 min |
| --- | --- | --- | --- | --- | --- |
| Control | 65 | — | 29.4 | 7.9 | 6.6 |
| Invention | 66 | Copolymer of Exp. 21 | 29.4 | 19.85 | 14.8 |
| Invention | 67 | Copolymer of Exp. 20 | 29.4 | 23.4 | 19.3 |

It is seen from Table 6 that the present polymers are effective as anti-scaling agents.

EXAMPLE 11

This Example relates to alkaline chlorinated formulations used, inter alia, as bleaching agents and disinfectants in detergent applications. The Example may also relate to other bleaching formulations commonly found in detergent practice.

In particular, the Example illustrates the use of the present polymers as anti-scaling agents and dispersants in such formulations, wherein it is shown that the presence of the polymers does not detract from the stability of alkaline chlorinated compositions, and does not promote a decrease in the chlorometric index, which would indicate a loss of effectiveness of the sodium hypochlorite solution contained in the detergent composition.

For each Experiment, a mixture comprising 50.65 g water, 29.35 g Javelle water of chlorometric index 36.96° Cl (see definition, infra), and 15 g 50% sodium hydroxide is prepared, in a 200 mL beaker, under agitation.

Experiment No. 69

Experiment illustrating the prior art, using a sodium polyacrylate produced according to a prior art method and having a specific viscosity of 0.56.

Experiment No. 70

Experiment illustrating the invention, using the polyacrylic acid from Experiment No. 9, completely neutralized with sodium hydroxide.

For each of these Experiments, the chlorometric index (°Cl) is determined by the same method, after 24 hr and after 8 da.

The results presented in Table 7 are in terms of "percent of hypochlorite remaining, based on the Control".

TABLE 7

| Experiment No. | Polymer | To (%) | 24 hours (%) | 8 Days (%) |
|---|---|---|---|---|
| Control | 68 | — | 100 | 100 | 100 |
| State of the Art | 69 | Polyacrylate (Na salt) specific $\mu = 0.56$ | 100 | 98.4 | 90.6 |
| Invention | 70 | Polyacrylate of Exp. 9 | 100 | 100 | 94.9 |

Table 7 reveals the changes in the chlorometric index for each of the solutions, illustrating that the present polymers do not destabilize the chlorometric index of the chlorine-containing alkali composition.

EXAMPLE 12

This Example relates to the use of polymers of the invention as fluidifying agent(s) for drilling muds and the like, wherein the aqueous phase is based on fresh (non-saline) water.

A drilling mud is prepared as follows:

500 cc fresh water is charged to a 5 L beaker, equipped with a Rayneri turbine stirrer of diameter 50 mm operated at 2000 rpm.

Then 3 g technical $Na_2CO_3$ is added rapidly under agitation, to precipitate $Ca^{2+}$ and $Mg^{2+}$ ions.

Then, continuing agitation, 75 g of a bentonite (A) (yield 20–25 cu m/ton metric, measured according to the standard OCMADFCP4-1973) is added to the mixture over a period of 15 min.

Thereafter, continuing agitation, 112.5 g of an attapulgite, (B) (yield 30–35 cu m/ton metric, measured according to the standard OCMA-DFCP1-1973) was added to the mixture over a period of 15 min.

Subsequently, still continuing agitation, 37.5 g of technical carboxymethylcellulose (low-viscosity, according to standard OCMA-DFCP2-1980) is added to the mixture over a period of 15 min.

Then, continuing agitation, 225 g of an argile, (C) of low swelling index (yield c. 15 cu m/ton metric) is added over a period of 20 min.

Following this, the pH of the medium is measured and is adjusted to a value in the range 9.5–10 by adding sodium hydroxide solution.

The resulting drilling mud is subjected to shearing action by means of a Sylverson Type L.R2 agitator provided with a high-shear grille of diameter 35 mm.

The drilling mud is then allowed to rest 24 hr, followed by agitation by the above-mentioned Rayneri turbine stirrer for c. 5 minutes.

Thereafter, two samples of 500 cc each are taken, to test the effectiveness of fluidifying agents of the invention.

Experiment No. 71 is a Comparison experiment, wherein there is added to the above-described drilling mud 7.5 g of a sodium polyacrylate of a specific viscosity of 0.4, which material is regarded as the best fluidifying agent known to the art.

Experiment No. 72 is a representative experiment of the invention, wherein there is added to the above-described drilling mud, as an active agent, 7.5 g of the sodium polyacrylate from Experiment No. 3, having a specific viscosity of 0.41.

The mixture for each of these Experiments is mixed 10 min with a Hamilton Beach mixer ("low" position), while maintaining the pH in the range of 9.5–10.

Following this mixing, the rheological characteristics at 20° C. are measured with a "FANN 35" viscometer; and the API characteristics of the filtrate are measured at a pressure of 100 psi over a period of 30 min, by the method familiar to persons skilled in the art.

The rheological characteristics measured are the apparent viscosity ("Va"), plastic viscosity ("Vp"), yield value ("Yv"), the gel at 0 and the gel at 10. These parameters are defined in the publication "Manual of Rheology of Drilling Muds and Slag Cements" (in French), 1979, pub. Edition Technip. All of these characteristics are reported in Table 8.

TABLE 8

| Experiment No. | State of the Art 71 | Invention 72 |
|---|---|---|
| pH | 9.51 | 9.50 |
| LECLT 600 T | 87 | 88 |
| LECT 300 T | 64 | 65 |
| Va | 43.5 | 44 |
| Vp | 23 | 23 |
| Yv | 41 | 42 |
| Gel 0 | 40 | 42 |
| Gel 10 | 250 | 255 |

It can be seen from Table 8 that the mud containing the polyacrylate of the invention has rheological characteristics equivalent to those of the mud containing a polyacrylate known to the art.

EXAMPLE 13

This Example relates to the use of polymers of the invention in ceramics technology.

A dispersion comprising a slip is prepared. For Experiment No. 73, a sodium polyacrylate of a specific viscosity of 0.4 known to the art is employed. For Experiment No. 74 the sodium polyacrylate from Experiment No. 3 of the invention is employed.

For each of these Experiments, the following are added to 1088.8 g water, under agitation:

1.645 g (dry weight) of the polymer being tested;

3.422 g sodium silicate; and 1.324 g sodium carbonate.

After the mixture is thoroughly mixed, 2800 g of an argile comprised essentially of argiles, feldspars, and sands is added.

After agitating for 1 hr, the Brookfield viscosities are measured with a Brookfield type "RVT" viscometer, at 1 rpm, 10 rpm, and 100 rpm.

The results obtained are presented in Table 9.

TABLE 9

|  |  | State of the Art | Invention |
|---|---|---|---|
|  |  | Experiment No. | |
|  |  | 73 | 74 |
| Viscosity at 1 | 1 T/mn | 4400 | 4350 |
| rpm (mPa-sec) | 10 T/mn | 1700 | 1600 |
|  | 100 T/mn | 1600 | 1500 |

It can be seen from Table 9 that the slip containing the polyacrylate of the invention has rheological characteristics equivalent to those of the slip containing a polyacrylate known to the art.

EXAMPLE 14

This Example relates to the use of polymers of the invention as water retention agent(s) in the papermaking industry.

For each Experiment, a coating slip having a dry matter content of 68% is prepared which contains the water retention agent being tested in the amount of 0.3 wt. % (dry basis) based on the dry weight of the calcium carbonate component.

For Experiment No. 75, the water retention agent is a sodium polyacrylate known to the art, having a specific viscosity of 5.0. For Experiment No. 76, illustrating the invention, the water retention agent is the inventive sodium polyacrylate from Experiment No. 13, having a specific viscosity of 4.8.

For each Experiment, the coating slip is prepared by adding to a 1000 mL beaker:
- an amount of water necessary to provide a final concentration of the slip of 68%; and
- an amount of a suspension of calcium carbonate of particle size distribution such that 90% of the particles have a particle size less than 2 micron providing 500 g of calcium carbonate on a dry weight basis.

After this suspension is formed, the given water retention agent is introduced, under agitation.

After agitating 15 min, a quantity of latex ("Acronal S 360 D", supplied by BASF) corresponding to 10.5 wt. % (dry weight of latex divided by dry weight of calcium carbonate) is added. After an additional 15 min of agitation, the Brookfield viscosities are measured at 10 rpm and 100 rpm at ambient temperature, using a Brookfield type "RVT" viscometer equipped with a no. 3 rotor.

To test water retention, the coating slip is subjected to a pressure of 100 psi (7 bar) in an API filter press having a permeable surface.

This filter press is comprised essentially of a bracket with a clamping screw which enables the three parts of the filter body to be held together, which three parts are namely:
- a base piece having an orifice and equipped with a delivery tube through which the filtrate exits, wherein the base piece supports a 60×80 mesh metal screen on which a filter paper 90 mm in diameter is placed (Fann® reference N 87000100 Box, supplied by Fann Instrument Company);
- a cylinder of 76.2 mm interior diameter and 128 mm height; and
- a cover provided with an inlet for compressed gas, and having a flat gasket to provide a seal between the cover and the cylinder, wherein the gasket is of the same type as those used on the base piece.

After 20 min under pressure in the filter, the volume of water collected in a graduated cylinder or the like disposed below the filter body is measured. The lower this volume, the better the water retention.

The results are presented in Table 10.

TABLE 10

|  | Experiment No. | Viscosity at 10 rpm (mPa-sec) | Viscosity at 100 rpm (mPa-sec) | Volume collected in 20 min. (mL) |
|---|---|---|---|---|
| State of the art | 75 | 5200 | 890 | 3.5 |
| Invention | 76 | 5000 | 800 | 3.2 |

It can be seen from Table 10 that a polymer of the invention may be used as a retention agent in the papermaking industry.

Obviously, numerous modifications and variations of the present invention are possible in light of the above teachings. It is, therefore, to be understood that within the scope of the appended claims, the invention may be practiced otherwise than as specifically described herein.

French priority Application No. 96 09345 filed Jul. 19, 1996 is hereby incorporated by reference.

What is claimed as new and desired to be secured by Letters Patent of the United States is:

1. A method of manufacturing homopolymers and/or copolymers, comprising:
   contacting ethylenically monounsaturated monomer(s) in an aqueous solution with a chain-transfer agent having a phosphorus atom of degree of oxidation less than 5, said phosphorous compound being introduced in amounts of 0.005–0.49 gram-atom phosphorus per mol of unsaturation in said ethylenically unsaturated monomer(s) in the presence of an initiator consisting of hydrogen peroxide in the absence of any agent(s) which decomposes hydrogen peroxide thereby forming free radicals, in the absence of any other generator of free radicals, and in the absence of any per salt or any other transfer agent, wherein for each monomer, the residual monomer concentration in said polymer is less than or equal to 300 ppm, based on the weight of the raw product, wherein the dry matter content is at least 38%, and wherein these constraints apply regardless of the monomer composition.

2. The method of claim 1, wherein the total necessary amount of the compound containing a phosphorus atom of degree of oxidation less than 5 is introduced into the aqueous solution gradually during the entire polymerization reaction, wherein the initial material charged to the reactor consists only of water.

3. The method of claim 1, wherein all or part of the necessary quantity of the compound containing a phosphorus atom of degree of oxidation less than 5 is introduced into the reaction vessel or into the starting mixture in the reaction vessel, prior to the start of polymerization, which introduction may occur in the presence of all or a part of the monomer(s) which is (are) to be polymerized, which monomer(s) is (are) in the acid form, or as a partially or completely neutralized acid, and in that the homopolymer(s) and/or copolymers is (are) prepared without addition of metals or metallic salts, which metals or metallic salts initiate the decomposition of hydrogen peroxide.

4. The method of claim 3, wherein all or part of the necessary quantity of the compound containing a phosphorus atom of a degree of oxidation less than 5 is introduced into the reaction vessel or into the starting mixture in the reaction vessel, prior to the start of the polymerization, in the presence of water alone, or in the presence of water plus all or part of the monomer(s) to be polymerized.

5. The method of claim 3, wherein all or part of the necessary quantity of the compound containing a phosphorus atom of degree of oxidation less than 5 is introduced in the reaction vessel or into the starting mixture in the reaction vessel, prior to the start of the polymerization, in the presence of all or part of the monomer(s) to be polymerized, which monomer(s) when introduced have been partially or completely neutralized by a basic sodium hydroxide, potassium hydroxide, or lithium hydroxide solution.

6. The method of claim 1, wherein the ethylenically unsaturated monomer(s) is (are) selected from the group consisting of (meth)acrylic acid, itaconic acid, crotonic acid, fumaric acid, maleic acid anhydride, isocrotonic acid, aconitic acid, mesaconic acid, sinapic acid, undecylenic acid, angelic acid; esters of the aforesaid acids; (acrylamidomethyl)propanesulfonic acid, acrolein, (meth) acrylamide; (meth)acrylamidopropyl trimethylammonium chloride, (meth)acrylamidopropyl trimethylammonium sulfate, ethyl trimethylammonium chloride (meth)acrylate, ethyl trimethylammonium sulfate (meth)acrylate, acryloyl (trimethylammonium chloride), acryloyl (trimethylammonium sulfate), or the non-quaternized homologs of any of these; dimethyldiallyl chloride, sodium methallyl sulfonate, ethylene glycol (meth)acrylate phosphate, propylene glycol (meth)acrylate phosphate, and vinylpyrrolidone.

7. The method of claim 6, wherein the ethylenically unsaturated monomer(s) is (are) selected from the group consisting of (meth)acrylic acid, maleic anhydride, ethyl acrylate, butyl acrylate, methyl methacrylate, acrylamide, and ethylene glycol methacrylate phosphate.

8. The method of claim 1, wherein the compound containing a phosphorus atom of degree of oxidation less than 5 is sodium hypophosphite or hypophosphorous acid.

* * * * *

UNITED STATES PATENT AND TRADEMARK OFFICE
CERTIFICATE OF CORRECTION

PATENT NO. : 6,063,884

DATED : May 16, 2000

INVENTOR(S): Jean-Bernard EGRAZ, et al.

It is certified that an error appears in the above-identified patent and that said Letters Patent is hereby corrected as shown below:

Column 8, line 63, "he" should read --the--.

Signed and Sealed this

Twenty-fourth Day of April, 2001

Attest:

NICHOLAS P. GODICI

Attesting Officer        Acting Director of the United States Patent and Trademark Office